UNITED STATES PATENT OFFICE.

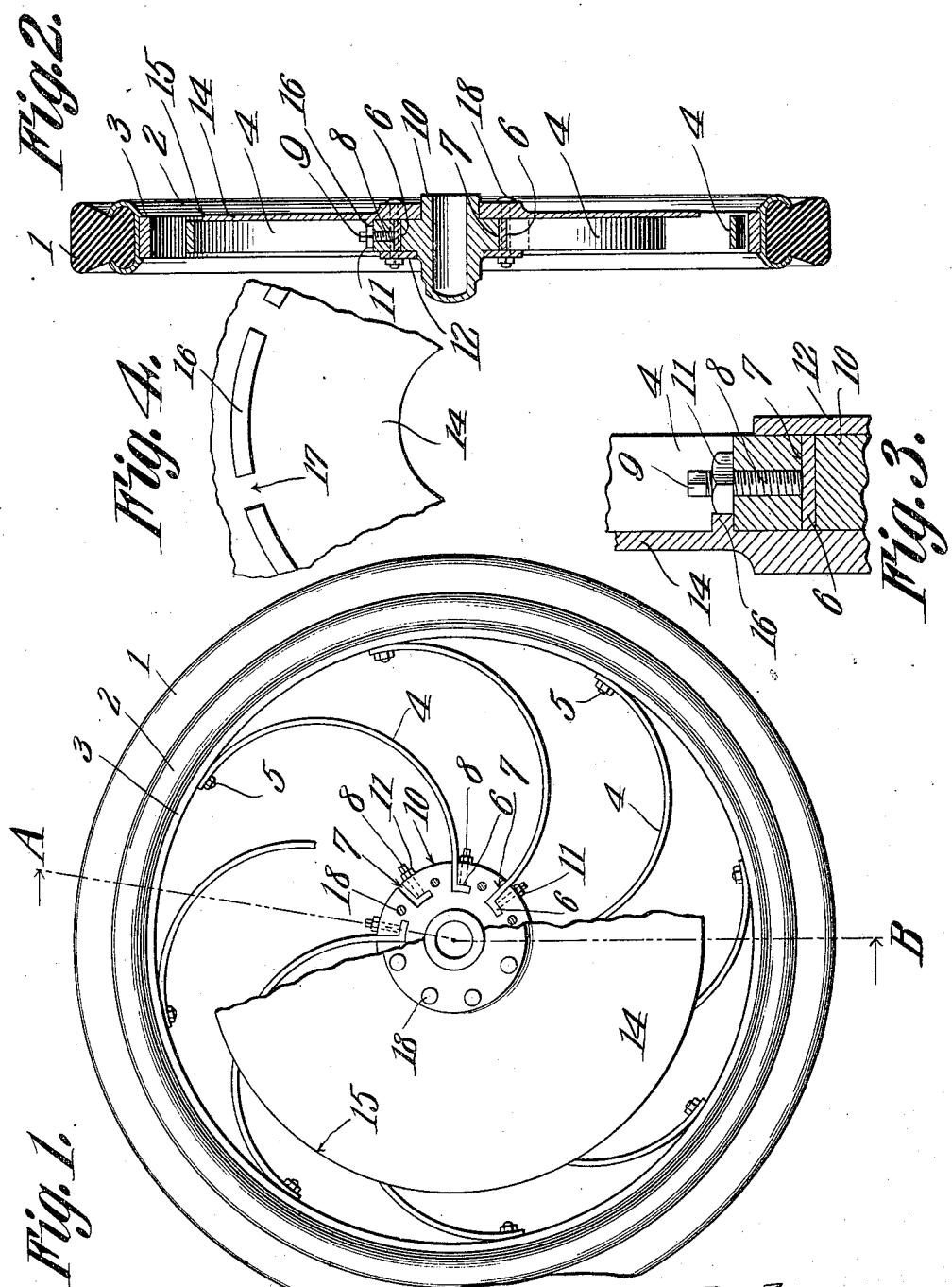

CHARLES I. DODSON, OF PITTSBURG, KANSAS, ASSIGNOR TO FUNK BROTHERS, OF CHICAGO HEIGHTS, ILLINOIS.

SPRING-WHEEL.

999,437.

Specification of Letters Patent. Patented Aug. 1, 1911.

Application filed September 7, 1910. Serial No. 580,846.

*To all whom it may concern:*

Be it known that I, CHARLES I. DODSON, a citizen of the United States, residing at Pittsburg, in the county of Crawford and State of Kansas, have invented a new and useful Spring-Wheel, of which the following is a specification.

It is the object of this invention to provide a resilient wheel, the spokes of which constitute the spring portion of the device, and to provide novel means for securing the spokes to the hub of the wheel, novel means being provided for limiting the movement of the rim of the wheel, under the yielding of the spokes of the wheel.

In the drawings, Figure 1 is a side elevation, parts being broken away; Fig. 2 is a transverse section upon the line A—B of Fig. 1; Fig. 3 is a fragmental transverse section upon the line A—B, Fig. 3 being an enlarged detail; and Fig. 4 is a plan, showing a portion of the inner face of one of the cover plates.

The rim of the wheel includes a tire 1 of any desired form, a tire receiving member 2, and a felly 3, to which the tire receiving member 2 is secured in any desired manner.

The spokes 4 of the wheel are curvilinear in outline, and are fashioned from resilient material. The outer ends of the spokes 4 are bolted, as shown at 5, or secured in any other desired manner to the rim of the wheel. The inner ends of the spokes 4 are, generally speaking L-shaped, so that projections 6 are formed at the inner ends of the spokes. These projections 6 are adapted to register in L-shaped openings 7, formed in the hub 10 of the wheel. These L-shaped openings 7 preferably extend entirely through the hub 10.

The invention further includes a plurality of locking devices, the locking devices including screws 8 threaded into the hub 10 radially of the same. The inner ends of the screws 8 are adapted to bear against the projections 6 of the spokes 4, as seen to best advantage in Figs. 2 and 3. The screws 8 are provided with polygonal turning heads 9 adapted to receive a wrench or key. Lock nuts 11 are mounted upon the screws 8, these lock nuts being adapted to be rotated upon the screws to engage the hub 10, thereby preventing the screws from moving out of engagement with the projections 6 of the spokes 4.

A cover plate 12 is applied to one side of the hub 10, and a cover plate 14 is applied to the opposite side thereof, these plates 12 and 14 being held in place by bolts 18 or other securing devices, extended through both plates and through the hub 10.

By noting Figs. 1 and 2, it will be seen that the cover plate 14 is peripherally extended, as shown at 15, into close relation to the felly 3 of the rim structure.

If desired, as shown to best advantage in Figs. 4 and 3, the inner face of the cover plate 14 may be provided with a plurality of ribs 16. These ribs 16, when the cover plate is placed upon the wheel, are adapted to engage the nuts 11, to hold the same against rotation. Obviously the spaces 17 between the ends of the ribs 16, are adapted to receive the spokes 4.

In practical operation, the inner ends of the spokes 4 are slid, transversely of the hub 10 into the openings 7 in the hub 10, the projections 6 upon the inner ends of the spokes 4, preventing the spokes from being withdrawn from the hub 10, longitudinally of the spokes. The screws 8 are rotated to a firm bearing upon the projections 6 of the spokes, the screws 8 thus serving to prevent the spokes from moving transversely of the hub 10, out of the openings 7. The lock nuts 11 upon the screws 8 serve to prevent the screws from rotating out of engagement with the projections 6 of the spokes 4. Moreover when the cover plate 14 is applied to the side of the hub 10, as shown in Fig. 3, the ribs 16 upon the plate 14, engaging the nuts 11 will prevent the said nuts from becoming loosened. It will be clearly seen that when the plates 12 and 14 are held in place by means of the bolts 18, the plates serve to prevent the spokes 4 from sliding transversely of the hub 10. By reason of the fact that the cover plate 14 is peripherally extended as shown at 15, into close relation with the felly 3 of the rim structure, this plate 14 is adapted to serve as an abutment to receive the rim of the wheel when the spring spokes 4 are unduly compressed. Thus, although the spokes 4 are thoroughly efficient to give the desired resiliency to the wheel, the spokes cannot be broken nor bent by the sudden application of a strain, exceeding the strain which the spokes are calculated to bear.

Having thus described the invention, what is claimed is:—

A vehicle wheel embodying a rim; spokes secured to the rim and provided with terminal projections; a hub having openings into which the projections may be slid transversely of the hub, to register therein against withdrawal longitudinally of the spokes; screws mounted in the hub and adapted to bear upon the projections of the spokes; hub-engaging lock nuts upon the screws; and plates applied to the ends of the hub, to hold the spokes in place within the hub, one of said plates having ribs adapted to bear against the peripheries of the lock nuts, to hold the same against rotation.

In testimony that I claim the foregoing as my own, I have hereto affixed my signature in the presence of two witnesses.

CHARLES I. DODSON.

Witnesses:
J. H. GHIESING,
EDWIN E. COULTER.